United States Patent Office 3,223,655
Patented Dec. 14, 1965

3,223,655
CURABLE COATING COMPOSITION COMPRISING COPOLYMER CONTAINING GRAFTED CARBOXYL OR ALKYLOLATED AMIDE GROUPS, AND AMINE/ALDEHYDE CONDENSATE OR EPOXY RESIN
James David Murdock, St. Hilaire Station, Quebec, Canada, assignor to Canadian Industries Limited, Montreal, Quebec, Canada, a corporation of Canada
No Drawing. Filed July 13, 1961, Ser. No. 123,633
Claims priority, application Great Britain, July 19, 1960, 25,140/60
4 Claims. (Cl. 260—4)

This invention relates to coating compositions and, more particularly, to coating compositions which may be heated after application to substrates to give hard, infusible films.

Processes for preparing such coating compositions are disclosed, for example, in Canadian Patent Nos. 534,002, 534,261 and 569,430. The compositions comprise a copolymer of styrene or vinyl toluene, acrylate and/or methacrylate esters and 2% to 15% of acrylic or methacrylic acids, together with a polyepoxide and a basic catalyst. On baking, these coating compositions become hard and infusible by a well known reaction, i.e. the base-catalysed cross-linking reaction of the epoxide groups of the polyepoxide with the free carboxylic acid groups of the copolymer. By this reaction the polymer chains are cross-linked to yield an infusible coating which has very desirable properties and is glossy, scratch resistant and not easily attacked by solvents or detergents.

Another similar process is disclosed in Canadian Patent No. 567,165. A copolymer of styrene, acrylate or methacrylate esters and 3–15% by weight of acrylamide or methacrylamide is formed into a coating composition by mixing with 5–40%, by weight of the copolymer, of a nitrogen resin and an acidic catalyst. On baking, the acrylamide-containing copolymer is cross-linked by the nitrogen resin to give a hard, glossy finish. Similarly, in Canadian Patent No. 578,345, an acrylamide-containing copolymer is reacted with an aldehyde and the product is cross-linked on baking with a polyepoxide.

It has been found, however, that the above coatings lack the extreme flexibility that is required in applications where a metal is to be formed after coating, or where a coated article is dented and must be beaten out. Such flexibility can be obtained by greatly increasing the amount of acrylate ester in the copolymers, but such increases have a corresponding deleterious effect on the hardness and solvent resistance of the films.

It is an object of this invention to provide a broad range of coating compositions containing an acrylic or vinyl copolymer and a cross-linking agent, which compositions will bake to give hard, infusible films that possess surprising flexibility. Further objects are to provide such films attached to metal substrates, and to provide a process for making such compositions and films. Additional objects will appear hereinafter.

The coating compositions of this invention comprise, essentially, an acrylic or vinyl copolymer adapted to be cross-linked on heating, said copolymer having been formed in the presence of from 2% to 20% by weight of a rubbery polymer selected from the group consisting of natural rubber, rubbery copolymers, butyl rubber, polyisoprene and poly(alkyl acrylates), a cross-linking agent for said copolymer, and, if necessary, a catalyst for the cross-linking reaction.

The forming of the copolymer in the presence of the rubbery polymer is most suitably accomplished by taking a solution of a preformed rubbery polymer and copolymerizing the acrylic or vinyl monomers in said solution. It is believed that the acrylic or vinyl copolymer is thus grafted onto the rubbery polymer chain, and the completed copolymers will be referred to hereinafter as graft copolymers, without however restricting the invention to any particular theory or mechanism. While the graft copolymers of vinyl or acrylic monomers onto rubbers are known (see, for example, U.S. Patent No. 2,908,661), it is believed to be an entirely novel discovery that, when the graft copolymers are subsequently cross-linked, films are obtained which possess the hitherto contradictory properties of hardness and flexibility. The type of baking enamels known in the trade as "acrylics" have hitherto given hard, glossy finishes of very low flexibility. The finishes known as "vinyls" have often given flexible coatings, but are soft and readily marked, and of dull appearance. The present invention combines the merits of both types.

The acrylic or vinyl copolymers grafted onto a rubbery polymer, according to this invention, may be prepared from a wide range of monomers; it is essential, however, that they be adapted to cross-link to hard, infusible masses upon heating. Amongst the means of achieving this cross-linking is the provision of reactive sites in the copolymers. These reactive sites may then react together upon heating, or a cross-linking agent and optionally a catalyst may be provided to yield the hard infusible products upon heating. Thus, for example, a copolymer may be prepared which contains free hydroxyl groups attached to the carbon chain. This may be accomplished by using as a monomer β-hydroxyethylmethacrylate, or by using acrylic acid as a monomer and subsequently reacting the acid groups with an olefinic oxide to yield β-hydroxyalkyl groups. Such a hydroxyl-containing copolymer, prepared in the presence of a rubbery polymer, may be mixed with a nitrogen resin (hereinafter described) to yield a composition which will cross-link on heating to give a hard, infusible yet flexible film. The copolymer may suitably include about 0.7% to 4.5% by weight of hydroxyl groups, and the coating composition may contain about 5% to 50% by weight of the nitrogen resin.

Similarly, a copolymer may be prepared containing both acrylic acid and glycidyl acrylate, according to the disclosure of Canadian Patent No. 499,491. When the monomers are copolymerized in the presence of a rubbery polymer, the resulting copolymer will self-cross-link upon heating, preferably in the presence of a basic catalyst, to give a hard, infusible yet flexible film.

In one particularly advantageous embodiment of the present invention, the copolymer (formed in the presence of the rubbery polymer) may be similar to those disclosed in Canadian Patent Nos. 534,002, 534,261 and 569,430 and is thus a copolymer of ethylenically unsaturated monomers which includes between 2% and 15% by weight of an α,β-unsaturated carboxylic acid and between 85% and 98% of neutral monomers. The carboxylic acid groups in this copolymer form the reactive sites through which cross-linking is accomplished, and by "neutral" monomers is meant those monomers which contain no groups which yield a reactive site in the copolymer. The cross-linking agent for this copolymer may be a polyepoxide present in a concentration ranging from 5% to 55% by weight of the copolymer, and in this case a basic catalyst is included in the composition. Alternatively a nitrogen resin may be used to cross-link the acid-containing copolymer; particularly preferred is the resinous hexamethyl ether of hexamethylmelamine use in an amount between 5% and 50%, by weight of the copolymer, with an acid catalyst.

In another advantageous embodiment, the composition of the copolymer (formed in the presence of the rubbery polymer) includes between 3% and 15% by weight of acrylamide, methacrylamide or an N-methylol derivative thereof and between 85% and 97% of neutral monomers. In this case, the cross-linking agent, present in a concentration of about 5% to 70% by weight of the copolymer, is a nitrogen resin, and the catalyst is acidic.

In a still further embodiment, a copolymer containing from 5% to 40% by weight of an acrylamide is formed in the presence of the rubbery polymer and is subsequently reacted with an aldehyde to substitute one or both of the amido hydrogen atoms by alkylol groups (as described in U.S. Patent No. 2,870,117). This copolymer becomes cross-linked on baking with from 5% to 40% by weight of a polyepoxide, optionally using a basic or acidic catalyst.

Furthermore, in an acrylamide-containing copolymer, wherein only part of the amide groups are alkylol-substituted, no additional cross-linking agent is required, and a composition containing such a copolymer may be cross-linked by itself.

All these compositions, when applied to suitable metal substrates, such as aluminum or phosphated steel, and baked thereon at a temperature between 110° C. and 200° C., react to give infusible coatings which possess the hitherto contradictory properties of hardness and flexibility. In particular, hard, solvent and detergent resistant films are produced which show a yield point on extension. This is best demonstrated by measuring stress-strain relationships on free films (i.e. those separated from the substrates) where prior coatings show a brittle break. The coatings of the present invention also show improved toughness as measured by the area under a stress-strain curve before rupture.

Thus the process of this invention comprises, essentially, copolymerizing copolymerizable ethylenically unsaturated monomers including at least one monomer adapted to provide cross-linkable groups in the resultant copolymer, in the presence of from 2% to 20% by weight of a rubbery polymer selected from the group consisting of natural rubber, rubbery copolymers, butyl rubbers, polyisoprene and poly(alkyl acrylates), and usually mixing the so formed copolymer with a reactive cross-linking agent for said copolymer and a suitable catalyst. The resultant composition is then applied as a coating film to a metallic substrate and baked thereon to yield a hard infusible and yet flexible coating.

The ethylenically unsaturated neutral monomers present in the acrylic or vinyl copolymers of this invention are those known to copolymerize in solution with initiation by peroxide or azo type catalysts. The monomers include styrene and the alkylated styrenes such as vinyl toluene and α-methyl styrene, acrylic and methacrylic esters of alcohols containing 1–10 carbon atoms, such as methyl, ethyl, butyl and 2-ethyl hexyl acrylates and methacrylates, vinyl chloride and minor proportions of other species such as acrylonitrile. If α,β-ethylenically unsaturated acid monomers are used to provide cross-linkable groups in the copolymer, they may be selected from such acids as acrylic, methacrylic, maleic, fumaric, itaconic and crotonic acids.

In order that the advantages of the present invention be fully obtained, it is preferred that the copolymerizable monomers be selected so that, in the absence of the preformed rubbery polymer, the copolymer would give a hard film when cross-linked. Thus it is preferred that at least 20% by weight of the monomers is selected from the group of monomers yielding hard films, i.e. from styrene, vinyl toluene, vinyl chloride and methacrylate esters, or conversely that not more than 78% be an acrylate. Films made from compositions including copolymers containing more than 78% of acrylate esters tend to be quite soft, and although their tenacity is improved by formation of the copolymers in the presence of rubbery polymers, such improvement is not readily demonstrated by the bump and bend tests described hereinafter on metal panels. The hard films used for protective coatings are of course within the preferred class.

It has already been mentioned that amongst the rubbery polymers suitable for use in the compositions of this invention are synthetic rubbers including butyl rubber and polyisoprene. Other synthetic rubbers suitable as substrates for grafting include the well known copolymers of butadiene with styrene, methyl methacrylate or acrylonitrile, usually made in aqueous emulsion. Minor proportions of other monomers such as acrylic acid or acrylamide are sometimes included. In all the synthetic rubbers, it is desirable that the gel content and molecular weight be as low as possible, for otherwise the coating compositions may be difficult to spray at reasonable solids content. Also suitable are the very low molecular weight butadiene-styrene copolymers which may still be liquid, and are more suitably described as liquid rubbers. If the molecular weight of a rubber is too high, it may be reduced by milling with heavy shearing, but even with the molecular weight reduced in this manner it is preferred that the amount of rubbery polymer used in the graft be limited to 2% to 15% by weight if it is desired to apply the resulting coating composition by spraying. For flow coating, however, or for roller or dip coating, the full amount of 2% to 20% may be used, and similarly the full amount of the polymers of the alkyl acrylates such as methyl, ethyl, propyl, butyl, 2-ethyl hexyl and dodecyl acrylates may be used. These polyacrylates are prepared by polymerization in solution or in bulk using a peroxide or azo catalyst, and it is desirable to form a polymer of comparatively high molecular weight, for example about 50,000–100,000 or more.

The improved flexibility of the coatings, made from a copolymer prepared in the presence of these polyacrylates, is shown to be surprising by the following experiments. A copolymer of styrene (72%), ethyl acrylate (20%) and acrylic acid (8%) may be cross-linked by a polyepoxide using a basic catalyst, to give an excellent, hard solvent resistant film. This film is rather brittle, but its flexibility may be expected to improve as the amount of ethyl acrylate in the monomer mixture is increased. However, in order to improve the flexibility of the film significantly, as shown by the bump and bend tests described hereinafter, it is necessary to increase the amount of ethyl acrylate in the copolymer to about 50%; by this increase the hardness of the cross-linked film is greatly reduced, and it becomes very susceptible to attack by grease and detergent solutions. On the other hand, it will be shown in the examples hereinafter that as little as 5% of poly(ethyl acrylate) may be used as a base for grafting the same copolymer, and the resulting cross-linked film has increased flexibility and still retains hardness and other properties indistinguishable from those of the film containing the non grafted copolymer. The rubbers are even more effective; as little as 2% of grafted rubber gives a demonstrable improvement in flexibility.

The polyepoxide cross-linking reagents used in the compositions of this invention for copolymers containing acid groups or alkylol-substituted amide groups (optionally in the latter case), are generally known as epoxy resins and must contain on the average at least two epoxide groups per molecule. By epoxide group is meant the three membered cyclic inner ethers represented by:

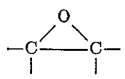

wherein the oxygen atom is linked to adjacent carbon atoms.

These cross-linking reagents are defined herein as polyepoxides and include both monomeric species, such as vinyl cyclohexene dioxide and polymeric species such as the known epoxide resins. The latter are generally low molecular weight condensation products of epichlorohydrin and a polyhydric alcohol or phenol such as glycerol or dophenylol propane (bis-phenol A). It is preferred that the polyepoxide should have a peroxide content of at least 7.5% by weight, a melting point not exceeding 75° C. and a Gardner viscosity not exceeding 1.65 poises as a 40% solution in ethylene glycol dibutyl ether.

The basic catalyst used to catalyse the cross-linking reaction between acid and epoxide groups in the coating compositions of this invention may be selected from a wide variety of compounds of known efficiency. For conventional coatings applied from organic solution, basic organic nitrogen compounds are preferred. Inorganic bases may also be used, and particularly if the acid-containing copolymer is rendered dispersible or soluble in water by the method of copending Canadian application Serial No. 792,948, inorganic bases such as caustic soda, or preferably water soluble amines such as triethylamine, may be used as the cross-linking catalysts. However, for coatings applied from organic solution, the preferred catalyst are organic bases such as tertiary amines and quaternary ammonium hydroxides wherein at least one of the alkyl group attached to the nitrogen atom has between 12 and 18 carbon atoms. Such catalysts should be present in an amount between about $\frac{1}{10}$ to $\frac{1}{100}$ of an equivalent, based on the acid in the copolymer. As an alternative in certain cases, the catalyst can be included as a nitrogen-containing monomer in the copolymer. For example, in Canadian Patent No. 534,001, vinyl pyridine is included in an acid-containing copolymer and acts as a catalyst for subsequent cross-linking by a polyepoxide. Dimethylaminoethyl methacrylate also serves the same purpose.

The cross-linking reagents used in the compositions of this invention to cross-link the rubber-grafted amide-containing copolymers are, as hereinbefore stated, nitrogen resins. These include the condensation products of formaldehyde with amine compounds such as urea, melamine and benzoguanamine. They are well accepted articles of commerce and are frequently sold in an alkylated form. Suitable catalysts for the cross-linking of amide-containing copolymers by such nitrogen resins are organic and inorganic acids or acid-yielding materials such as esters of the acids. Similar catalysts are also used to cross-link the alkylol-substituted acrylamide-containing copolymers with polyepoxides. Examples of such materials are boron trifluoride, aluminum chloride, perchloric acid, phosphoric acid, maleic acid, p-toluene sulphonic acid, n-butyl sulphamic acid, methane suphonic acid, tetrachlorophthalic acid or its monobutyl ester and octadecylamine p-toluene sulphonate.

The catalysts or initiators employed for the graft copolymerization in the process of this invention are those commonly employed in vinyl-type solution polymerizations. They include the hydroperoxides of generic formula R—OOH, the dialkyl peroxides R—O—O—R, where R is an alkyl radical, and also the acetyl, benzoyl and similar peroxides

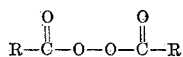

where R may be a linear or branched chain aliphatic radical or an aromatic hydrocarbon radical. Other known vinyl polymerization initiators include the azo type of formula

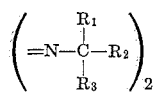

where $R_1$ is a lower alkyl or cycloalkyl radical, $R_2$ is a lower alkyl, cycloalkyl or acyl radical and $R_3$ is in a carbonitrile, carbonamide or carbalkoxy radical. Suitable catalysts thus include acetyl peroxide, benzoyl peroxide, tertiary-butyl perbenzoate, lauryl peroxide, dibutyryl peroxide, tertiary-butyl hydroperoxide, cumene hydroperoxide, azo-bis(isobutyronitrile) and azo-bis(isobutyrocarbonamide).

The following examples are given to illustrate the invention and are not to be construed as limiting the same. All parts and percentages are by weight unless otherwise stated.

EXAMPLE 1

A graft of a vinyl toluene/ethyl acrylate/acrylic acid copolymer onto nominally 10% by weight of a low molecular weight rubber was prepared in the following manner. The rubber was a copolymer of butadiene and styrene sold under the name "Buton" 100 and was said to have a molecular weight of 8000–10,000.

7 lbs. 5 ozs. of "Buton" 100 were dissolved in 80 lbs. 5 ozs. of xylene and the mixture brought to reflux in a 50 gallon kettle. The following 4 monomer charges were added successively over 1 hr. (i.e. ¼ hr. for each charge) to the well stirred refluxing solvent.

|  | No. 1 | No. 2 | No. 3 | No. 4 |
|---|---|---|---|---|
| Vinyl toluene: |  |  |  |  |
| Pounds | 12 | 12 | 12 | 12 |
| Ounces | 13 | 13 | 13 | 13 |
| Ethyl acrylate: |  |  |  |  |
| Pounds | 3 | 3 | 3 | 3 |
| Ounces | 9 | 9 | 9 | 9 |
| Acrylic acid: |  |  |  |  |
| Pounds | | 1 | 1 | 2 |
| Ounces | 15 | 3 | 9 | |
| Benzoyl peroxide, g | 81.5 | 81.5 | 81.5 | 81.5 |
| T-butyl hydroperoxide*, g | 130.5 | 130.5 | 130.5 | 130.5 |

*60% total solids in isopropanol.

The reaction mixture was held at a gentle reflux for another 4 hours. Then 16 lbs. of xylene, water and monomers (non reacted) were stripped off and 16 lbs. of butanol returned to the kettle. The resin was pressure filtered through a Sparkler filter.

Total solids of resin solution=48.9%.

Gardner viscosity=V–W.

In a similar manner, copolymers were prepared in the presence of 2%, 5% and 20% of "Buton" 100 and each was made into a coating composition by admixture with an epoxy resin (defined hereinbefore) in an amount such that one equivalent of epoxide group was present for each equivalent of acid, and a basic catalyst (¹⁄₃₄ equivalent based on acid). The epoxy resin was "Epon 828," being a condensation product of epichlorohydrin and diphenylol propane, and the catalyst was a tertiary amine having one long chain substituent (coconut oil residue) and two methyl substituents. The resulting mixture was pigmented with a $TiO_2$ pigment at a 1:1 pigment:binder ratio by a sand grind, and after spraying onto phosphated steel was baked at 150° C. for 30 minutes. The properties are compared in Table I.

Table I

| Proportion of Rubbery Polymer (by weight of copolymer) | Coin Scratch | 90 Bend | Bump Test | | Thickness (Mils) |
|---|---|---|---|---|---|
| | | | In | Out | |
| 0 | 4 | 3 | 5 | 3 | 1.5 |
| | | 0 | 5 | 0 | 2.0 |
| 2 | 4 | 4 | 8 | 5 | 1.5 |
| | | 3 | 7 | 4 | 2.0 |
| 5 | 4 | 5 | 8 | 5 | 1.5 |
| | | 3 | 7 | 4 | 2.0 |
| 10 | 4 | 8 | 10 | 8 | 1.5 |
| | | 7 | 10 | 5 | 2.0 |
| 20 | 4 | 10 | 10 | 10 | 1.5 |
| | | 10 | 10 | 10 | 2.0 |

From these results it can be seen that the hardness of the coating as shown by the coin scratch test was unaffected by the inclusion of the grafted rubber, whereas the flexibility was improved. Thickness was also measured since apparent flexibility was affected by thickness variations. The bend test was a simple 90° bend of the panel over a sharp edge, whereas the bump test was an impact of 36 in. lbs. energy by a hemisphere of ⅝ in. diameter. The results were rated visually, 10 being no defects; at about 8 minor cracking was observed at the apex of the bump; at about 5 the cracking extended part way down the bump; at about 3 the cracking extended around the bottom of the bump; and at 0 some flaking started. A similar scale was used for the 90° bend test results.

of epoxide for each acid group in the copolymer was used. However, reduced cross-linking given by lesser amounts of polyepoxide is still effective, and the advantages of the present invention at lower levels of cross-linking are shown in Table III. The experimental details are the same as those given in Example 1, except for the polyepoxide.

*Table III*

PROPERTIES OF A COATING FROM A COPOLYMER OF VINYL TOLUENE, ETHYLACRYLATE AND ACRYLIC ACID (72/20/8) MODIFIED BY GRAFTING ONTO RUBBER

| Modification to Copolymer | Epoxide Resin and wt. percent | Coin Scratch | 90° Bend | Bump Test In | Bump Test Out | Thickness, mils. |
|---|---|---|---|---|---|---|
| None | "Epon 828" 11% | 4 | 3 | 3 | 5 | 1.5 |
|  |  |  | 0 | 0 | 2 | 2.0 |
| Do | "Epon 828" 17% | 4 | 3 | 5 | 5 | 1.5 |
|  |  |  | 0 | 3 | 2 | 2.0 |
| 10% "Buton" 100 | "Epon 828" 10% | 4 | 6 | 6 | 6 | 1.5 |
|  |  |  | 5 | 3 | 2 | 2.0 |
| None | "Epon 562" 8.5% | 4 | 5 | 3 | 3 | 1.5 |
|  |  |  | 3 | 0 | 0 | 2.0 |
| 10% "Buton" 100 | "Epon 562" 7.5% | 4 | 5 | 3 | 5 | 1.5 |
|  |  |  | 3 | 2 | 2 | 2.0 |

"Epon 828" is described hereinbefore. "Epon 562" is a condensation product of epichlorohydrin and glycerol.

EXAMPLE 2

In a similar manner to that of Example 1, vinyl toluene/ethyl acrylate/acrylic acid copolymers were prepared in the presence of the rubbery polymers shown in Table II. The properties of the resultant epoxide cross-linked coatings are given in this table.

EXAMPLE 4

The vinyl toluene of the copolymers of Examples 1 and 2 was replaced by styrene, and the flexibility of all the systems increased very slightly. There was still, however, a very marked improvement when the copolymerization was conducted in the presence of the rubbery polymers.

*Table II*

| Proportion of Rubbery Polymer (by weight of copolymer) | Coin Scratch | 90° Bend | Bump Test In | Bump Test Out | Thickness (Mils) |
|---|---|---|---|---|---|
| None | 4 | 3 | 5 | 3 | 1.5 |
|  |  | 0 | 5 | 0 | 2.0 |
| 2% High mol. wt. Poly (ethyl acrylate) | 4 | 5 | 8 | 7 | 1.5 |
|  |  | 4 | 7 | 4 | 2.0 |
| 5% High mol. wt. Poly (ethyl acrylate) | 4 | 7 | 10 | 8 | 1.5 |
|  |  | 5 | 7 | 5 | 2.0 |
| 2% Low mol. wt. Poly (ethyl acrylate) | 4 | 3 | 5 | 5 | 1.5 |
|  |  | 3 | 5 | 4 | 2.0 |
| 3% Natural Rubber (smoked sheet) | 4 | 5 | 8 | 7 | 1.5 |
|  |  | 1 | 5 | 4 | 2.0 |
| 5% Natural Rubber (smoked sheet) | 4 | 10 | 10 | 8 | 1.5 |
|  |  | 8 | 10 | 5 | 2.0 |
| 3% Natural Rubber (pale crepe) | 4 | 5 | 8 | 5 | 1.5 |
|  |  | 4 | 7 | 4 | 2.0 |
| 10% Natural Rubber (pale crepe) | 4 | 8 | 10 | 8 | 1.5 |
|  |  | 7 | 10 | 7 | 2.0 |
| 4.6% "Hycar" rubber | 4 | 7 | 8 | 7 | 1.5 |
|  |  | 4 | 7 | 3 | 2.0 |
| 2% "Krylene" rubber | 4 | 5 | 7 | 5 | 1.5 |
|  |  | 3 | 5 | 3 | 2.0 |
| 3.7% "Krylene" rubber | 4 | 7 | 10 | 7 | 1.5 |
|  |  | 3 | 10 | 5 | 2.0 |
| 3% Natural Rubber (unmasticated) | 4 | 7 | 5 | 4 | 1.9 |

The high molecular weight poly(ethyl acrylate) was prepared by bulk polymerization and subsequently dissolved while hot in 95:5 xylene-butanol, prior to the addition of the monomers for copolymerization. The low mol. wt. polymer was prepared by solution polymerization. Their mol. wts. were about 50,000 to 100,000 and about 20,000 respectively. The "Hycar" (trademark) rubber was a copolymer of butadiene and acrylonitrile with a small acid content, while the "Krylene" (trademark) rubber was a 75:25 butadiene:styrene synthetic rubber. All the rubbers were masticated except the last sample.

EXAMPLE 3

It is in general desirable that the coatings of this invention should be fully cross-linked; they should be given a good bake, and the amount of cross-linking agent should be ample. For example, in Table I, a full equivalent

EXAMPLE 5

A copolymer of 78 parts of styrene, 15.75 parts of ethyl acrylate and 6.25 parts of acrylamide was prepared by bringing to reflux a solution of the acrylamide and two thirds of each of the other monomers in 50 parts of a 1:1 mixture of xylene and butanol (A solution) and adding thereto over a 2 hour period a solution of the remaining monomers and 1 part of each of benzoyl peroxide and t-butyl hydroperoxide in 50 parts of xylene (B solution). The preparation was repeated with the addition of the preformed flexibilizing polymers detailed in Table IV. The rubbery polymer was added in three ways, either entirely to Solution A, or ⅔ to A and ⅓ to B, or ⅓ to A and ⅔ to B. The latter was found slightly preferable.

Each of these copolymer solutions was mixed with either 10% or 20% (based on the weight of copolymer) of a butylated urea-formaldehyde resin and 0.2% of butyl sulphuric acid catalyst. After spraying on a steel panel, the coatings were baked at 120° C. for 30 minutes. Table IV shows the properties of the resulting coatings.

This resin and one prepared similarly without the "Buton" 100 were pigmented with 60 parts $TiO_2$ per 100 parts of resin, and after the addition of 0.5% p-toluenesulphonic acid, were sprayed as films and baked at 150° C. for 30 minutes. In additional examples, 5% by weight of "Epon 828" was added. The results are shown in Table V.

Table V

| Percentage of Rubbery Polymer | Percentage of "Epon 828" | Coin Scratch | 90° Bend | Bump Test | | Thickness, mils. |
|---|---|---|---|---|---|---|
| | | | | In | Out | |
| 0 | 5.0 | 4 | 7 | 7 | 5 | 1.5 |
| 0 | 0 | 3½ | 3 | 3 | 0 | 1.5 |
| 10 | 5.0 | 4 | 7 | 8 | 7 | 1.5 |
| 10 | 0 | 3½ | 7 | 8 | 5 | 1.5 |

Table IV

| Rubbery Polymer (by weight of copolymer) | U.F. Resin level percent | Coin Scratch | Bump Test | |
|---|---|---|---|---|
| | | | In | Out |
| None | 10 | 2.5 | 3 | 3 |
| | 20 | 3.0 | 2 | 1 |
| 2% "Krylene" Rubber (masticated). | 10 | 4 | 5 | 4 |
| | 20 | 4 | 5 | 4 |
| 2% Natural Rubber (smoked sheet) (masticated). | 10 | 4 | 7 | 5 |
| | 20 | 4 | 3 | 3 |
| 10% Poly(ethyl acrylate) low mol. wt. | 10 | 3 | 3 | 5 |
| | 20 | 3 | 3 | 3 |

EXAMPLE 6

A copolymer according to the process of this invention was prepared by the following method to contain methylolated amide groups as the reactive cross-linking sites. (Butyl Formcel is a commercial solution of formaldehyde in butanol.)

*Composition of the copolymer.*—Styrene/ethyl acrylate/acrylamide (60/25/15) grated on 10% of "Buton" 100 (a styrene-butadiene liquid rubbery copolymer).

The following monomer mixture was prepared:

| | G. |
|---|---|
| Styrene | 480 |
| Ethyl acrylate | 200 |

The following mixture was brought to reflux in a 5-litre pot:

| | G. |
|---|---|
| Butanol | 300 |
| Acrylamide | 120 |
| Monomer mixture (as above) | 440 |
| t-Dodecyl mercaptan | 8 |
| Xylene | 100 |
| "Buton" 100 | 40 |

The following mixtures were added simultaneously over 1½ hours to the refluxing solution.

Solution A:

| | G. |
|---|---|
| Xylene | 200 |
| Butanol | 140 |
| Monomer mixture | 240 |
| t-Butylhydroperoxide | 24 |
| Benzoyl peroxide | 16 |

Solution B:

| | |
|---|---|
| Xylene | 140 |
| "Buton" 100 | 40 |

After 1 hour of refluxing, 15 g. t-butylhydroperoxide was added. The reaction was continued at reflux for another 4 hours.

Then the following solution was added:

| | G. |
|---|---|
| Butyl Formcel | 268 |
| Maleic anhydride | 3.2 |
| Butanol | 250 |

The reflux conditions were maintained for another 3 hours and 250 g. of distillate was removed.

Total solids=45.6%.
Gardner-Holdt viscosity=Y.

EXAMPLE 7

Copolymers as in Examples 1 and 2 were prepared wherein the substrate rubbery copolymer was in one case "Buton" A500 and in the second was a masticated natural rubber-pale crepe. "Buton" A500 is a liquid rubbery polymer of butadiene and styrene of a molecular weight about 16,000–20,000. Each of these copolymers was mixed with a melamine-formaldehyde resin, specifically the resinous hexamethyl ether of hexamethylol melamine, pigmented with $TiO_2$ (50 parts per 100 of resin) and catalysed with 0.5% p-toluene sulphonic acid. The coating composition was then sprayed as a film onto phosphated steel and baked at 120° C. for 30 minutes. Table VI records the results.

Table VI

| Percentage of Rubbery Polymer | Percentage of Melamine Resin | 90° Bend | Bump Test | | Thickness Mils. |
|---|---|---|---|---|---|
| | | | In | Out | |
| 0 | 18 | 3 | 8 | 0 | 1.5 |
| 0 | 9 | 3 | 8 | 1 | 1.5 |
| 10% "Buton" | 18 | 5 | 10 | 3 | 1.5 |
| 10% "Buton" | 9 | 3 | 10 | 2 | 1.5 |
| 7.5% pale crepe | 18 | 8 | 10 | 5 | 1.5 |
| 7.5% pale crepe | 9 | 3 | 10 | 2 | 1.5 |

The improvement in flexibility of the last four coatings is demonstrated; visually the effect is larger than the numbers indicate.

EXAMPLE 8

Further copolymers were prepared of 68% vinyl toluene, 20% ethyl acrylate and 12% acrylic acid, both in the presence and absence of a rubbery polymer. In each case about five sixths of the carboxyl groups in the copolymer was reacted with butylene oxide to give β-hydroxy-butyl groups, wherein the hydroxyl is the reactive cross-linking site. Each copolymer was made into a coating composition using 20% of a butylated urea-formaldehyde resin as a cross-linking agent, and 0.75% of p-toluene sulphonic acid as a catalyst. The composition was pigmented with 50 parts $TiO_2$ per 100 parts of resin, sprayed onto phosphated steel and baked at 120° C. for 30 minutes. The results are given in Table VII.

Table VII

| Percentage of Rubbery Polymer | 90° Bend | Bump Test | | Thickness Mils. |
|---|---|---|---|---|
| | | In | Out | |
| None | 0 | 5 | 0 | 1.5 |
| 5% pale crepe | 5 | 7 | 2 | 1.5 |
| 10% "Buton" A500 | 5 | 7 | 1 | 1.5 |

I claim:
1. A coating composition adapted to form a hard but flexible coating upon baking on a substrate, which contains essentially a mixture selected from the group consisting of
   (I) a mixture of
      (A) a graft copolymer resulting from the copolymerization of at least one monoethylenically unsaturated monomer having ethylenic unsaturation as sole reactive group with an $\alpha,\beta$-monoethylenically unsaturated carboxylic acid in the presence of from 2% to 20%, based on the combined weight of said monomer and acid, of a rubbery material selected from the group consisting of natural rubber, rubbery copolymers of butadiene and styrene containing from 20% to 30% by weight of stylene, rubbery copolymers of butadiene and acrylonitrile containing from 20% to 40% by weight of acrylonitrile and rubbery polymeric ethyl acrylate having a molecular weight in excess of 20,000, and
      (B) a cross-linking agent selected from the group consisting of epoxidized materials containing at least two epoxide groups per molecule and resinous hexamethyl ethers of hexamethylmelamine;
   (II) a mixture of
      (A) a graft copolymer resulting from the copolymerization of at least one monoethylenically unsaturated monomer having ethylenic unsaturation as sole reactive group with acrylamide in the presence of from 2% to 20%, based on the combined weight of said monomer and acrylamide, of natural rubber, and
      (B) as cross-linking agent, an amine-aldehyde resin;
   (III) a mixture of
      (A) a graft copolymer resulting from the copolymerization of at least one monoethylenically unsaturated monomer having ethylenic unsaturation as sole reactive group with acrylamide in the presence of from 2% to 20%, based on the combined weight of said monomer and acrylamide, of a rubbery copolymer of butadiene and styrene containing from 20% to 30% by weight of styrene, and
      (B) as cross-linking agent, an amine-aldehyde resin;
   (IV) a mixture of
      (A) a graft copolymer resulting from the copolymerization of at least one monoethylenically unsaturated monomer having ethylenic unsaturation as sole reactive group with acrylamide in the presence of from 2% to 20%, based on the combined weight of said monomer and acrylamide, of a rubbery polymeric ethyl acrylate having a molecular weight in excess of 20,000, and
      (B) as cross-linking agent, an amine-aldehyde resin;
   (V) a mixture of
      (A) a graft copolymer resulting from the copolymerization of at least one monoethylenically unsaturated monomer having ethylenic unsaturation as sole reactive group with an N-alkylol derivative of acrylamide in the presence of from 2% to 20%, based on the combined weight of said monomer and derivative, of a rubbery copolymer of butadiene and styrene containing from 20% to 30% by weight of styrene, and
      (B) as cross-linking agent, an epoxidized material containing at least two epoxide groups per molecule;
   (VI) a mixture of
      (A) a graft copolymer resulting from the copolymerization of at least one monoethylenically unsaturated monomer having ethylenic unsaturation as sole reactive group with an $\alpha,\beta$-monoethylenically unsaturated carboxylic acid in the presence of from 2% to 20%, based on the combined weight of said monomer and acid, of a natural rubber, the carboxylic acid groups of said copolymer having been in part reacted with an olefinic oxide to form $\beta$-hydroxyalkyl groups, and
      (B) as cross-linking agent, an amine-aldehyde resin; and
   (VII) a mixture of
      (A) a graft copolymer resulting from the copolymerization of at least one monoethylenically unsaturated monomer having ethylenic unsaturation as sole reactive group with an $\alpha,\beta$-monoethylenically unsaturated carboxylic acid in the presence of from 2% to 20% based on the combined weight of said monomer and acid, of a rubbery copolymer of butadiene and styrene containing from 20% to 30% by weight of styrene, the carboxylic acid groups of said copolymer being in part reacted with an olefinic oxide to form $\beta$-hydroxyalkyl groups, and
      (B) as cross-linking agent, an amine-aldehyde resin.

2. A coating composition as claimed in claim 1 wherein in the mixture I the graft copolymer (A) includes from 2% to 15% by weight of an $\alpha,\beta$-unsaturated carboxylic acid, and the cross-linking agent (B) is an epoxidized material containing at least two epoxide groups per molecule present in a concentration of from 5% to 55% by weight of the graft copolymer.

3. A coating composition as claimed in claim 2 containing a basic catalyst for promoting cross-linking of (A) and (B) upon baking.

4. A substrate having deposited thereon a heat hardened film of the composition of claim 1.

References Cited by the Examiner

UNITED STATES PATENTS

| | | | |
|---|---|---|---|
| 2,604,464 | 7/1952 | Segall et al. | 260—837 |
| 2,927,095 | 3/1960 | Witt | 260—876 |
| 3,035,008 | 5/1962 | Gaylord | 260—855 |
| 3,118,853 | 1/1964 | Hart et al. | 260—851 |

FOREIGN PATENTS 867,480   5/1961   Great Britain.

MURRAY TILLMAN, *Primary Examiner.*

WILLIAM H. SHORT, *Examiner.*